United States Patent
Langford et al.

(10) Patent No.: US 8,607,308 B1
(45) Date of Patent: Dec. 10, 2013

(54) SYSTEM AND METHODS FOR FACILITATING PRIVACY ENFORCEMENT

(75) Inventors: Mark W. Langford, Huntersville, NC (US); James M. Krell, Roanoke, VA (US); Michael P. Galloway, Charlotte, NC (US); Laura P. Misenheimer, Waxhaw, NC (US); Brian L. Stump, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 1389 days.

(21) Appl. No.: 11/462,798

(22) Filed: Aug. 7, 2006

(51) Int. Cl.
*G06F 17/30* (2006.01)

(52) U.S. Cl.
USPC ............ 726/2; 726/1; 726/3; 726/4; 707/754; 707/783; 705/1.1; 705/2

(58) Field of Classification Search
USPC ................. 726/1–4; 707/754, 783; 705/1.1, 2
See application file for complete search history.

(56) References Cited

U.S. PATENT DOCUMENTS

| | | | |
|---|---|---|---|
| 6,115,690 A * | 9/2000 | Wong ............................ | 705/7.27 |
| 6,275,824 B1 * | 8/2001 | O'Flaherty et al. ................... | 1/1 |
| 6,480,850 B1 * | 11/2002 | Veldhuisen ............................ | 1/1 |
| 6,820,082 B1 * | 11/2004 | Cook et al. ..................... | 707/754 |
| 6,904,417 B2 * | 6/2005 | Clayton et al. .................. | 705/59 |
| 7,313,575 B2 * | 12/2007 | Carr et al. ............................. | 1/1 |
| 7,353,532 B2 * | 4/2008 | Duri et al. ......................... | 726/1 |
| 7,548,933 B2 * | 6/2009 | Krishnamurthy et al. ............ | 1/1 |
| 7,644,089 B2 * | 1/2010 | Stewart et al. ................ | 707/781 |
| 2003/0069894 A1 * | 4/2003 | Cotter et al. ............... | 707/104.1 |
| 2003/0097383 A1 * | 5/2003 | Smirnov et al. ............... | 707/204 |
| 2004/0199781 A1 * | 10/2004 | Erickson et al. ............... | 713/200 |
| 2004/0215610 A1 * | 10/2004 | Dixon et al. ....................... | 707/3 |
| 2004/0243816 A1 * | 12/2004 | Hacigumus et al. .......... | 713/193 |
| 2005/0043961 A1 * | 2/2005 | Torres et al. ....................... | 705/1 |
| 2006/0123461 A1 * | 6/2006 | Lunt et al. ......................... | 726/1 |
| 2006/0149739 A1 * | 7/2006 | Myers .............................. | 707/9 |
| 2006/0248592 A1 * | 11/2006 | Agrawal et al. ................. | 726/26 |
| 2007/0220004 A1 * | 9/2007 | Fifield et al. ....................... | 707/9 |
| 2008/0270174 A1 * | 10/2008 | Schlesinger et al. ............. | 705/1 |

* cited by examiner

*Primary Examiner* — Yin-Chen Shaw
(74) *Attorney, Agent, or Firm* — Michael A. Springs; Moore and Van Allen, PLLC; Patrick B. Horne (57) ABSTRACT

A system and methods for facilitating privacy enforcement are described. Embodiments of the present invention can deliver automated compliance and/or enforcement for certain consumer privacy laws and privacy-related policies to employees and contractors of an enterprise. When input related to the use of stored customer information is received, data subsystems can be accessed by a privacy engine, which then provides decisioning to produce an enforcement action. Examples of enforcement actions can include denying access to customer information, or granting such access but filtering the information. Enforcement actions can also include updating stored tables or other data structures to maintain an appropriate privacy enforcement posture when new information is added to systems or existing information is changed.

21 Claims, 8 Drawing Sheets

SYSTEM AND METHODS FOR FACILITATING PRIVACY ENFORCEMENT

BACKGROUND

Today, many businesses must comply with various privacy policies, regulations, and guidelines, whether established internally, by a regulatory entity, or as a result of legislation. U.S. national laws, for example, the Fair Credit Reporting Act, the Equal Credit Opportunity Act, and the Insurance Information and Privacy Protection Act, just to name a few, have privacy provisions that apply to customer information maintained by various business enterprises. At least some of these laws place the ultimate responsibility on the Board of Directors of an institution for overseeing consistent compliance, so that there is an increasing need for a comprehensive governance process to assure the privacy of customer information across an entire business organization. For very large and geographically diverse organizations, these requirements can create a significant challenge and resource expenditure.

Historically, efforts to enforce privacy requirements have centered around separate systems and depended on the education and awareness levels of employees of the enterprise. These efforts can lack currency and are sometimes not adequately monitored and updated over time. Therefore, there is a need for an integrated process and system for efficiently enforcing privacy policies and regulations, within a business enterprise.

SUMMARY

Embodiments of the present invention can deliver to associates of an enterprise (employees and contractors) automated compliance and/or enforcement for certain consumer privacy laws and privacy-related policies. Associate, legal, and customer information can be used together in a dynamic process to control the viewing of customer data. An embodiment of the invention can include the capability of receiving as input, information about laws, regulations, enterprise policies, associate attributes, customer privacy preferences, and customer data elements. Controls can be applied at the data element level.

A process according to example embodiments of the invention can include receiving input related to use of stored customer information. One or more data subsystems can be accessed by a centralized enforcement engine (also known as a privacy engine). These data subsystems can include detailed data related to at least one of associates, laws, regulations and customers. The input can take the form of associate inquiries, or changes to enforcement or subsystem data. The subsystem data enables privacy enforcement relative to customer information that may be stored in the enterprises routinely accessed internal and external systems.

Enforcement actions relative to stored customer information can be carried out based on decisioning enabled by characterization of the data. For example, some of the data can be characterized as restricted or regulated. In some embodiments, a Cartesian product of tables that encompass associate and customer information is used in the decisioning process. Examples of enforcement actions can include denying access to customer information by an associate or associates, or selectively displaying data by filtering the information. Enforcement actions can also include updating stored tables or other data structures to maintain an appropriate enforcement posture when new information is added to systems or stored information is changed.

A system or systems for implementing example embodiments of the invention can include a plurality of source data subsystems to provide data related to use of stored customer information. This data can be related to, for example, laws, regulations, associates, metadata about customer information, and reasons for accessing customer information. Connectivity to systems containing stored customer information, for example, via networking resources and middleware, can be provided. In example embodiments, a privacy engine provides decisioning, and produces enforcement actions relative to the stored customer information. The privacy engine can include an on-line enforcement subsystem and a batch enforcement subsystem. The source data subsystems can include an associate affiliate subsystem, a governed data label subsystem, an account/customer/household affiliate subsystem, and an associate business purpose subsystem. A system carrying out an embodiment of the invention may take the form of, or be enabled by a computer program product including a computer usable medium encoded with computer usable program code or instructions. Such computer usable code coupled with operating systems and appropriate instruction execution or computer systems, network, and the like can form the means to carry out the invention.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Example embodiments of the invention disclosed herein may invoke or appear to invoke an enterprise such as a bank or similar financial institution. It should be understood that terms like "bank" and "financial institution" as well as terms like "account," "enterprise," "household," "affiliate" and "customer" are used herein in their broadest sense. Institutions, organizations, small businesses, and corporations that maintain various types of accounts are widely varied in their organization and structure, as well as are the accounts themselves. These terms are intended to encompass all possibilities, including but not limited to finance companies, stock brokerages, credit card companies, telephone companies, mortgage companies, manufacturers who provide services and goods, etc. For example, an account at a telecommunications company such as a long distance provider can be considered an account for purposes of this disclosure, and embodiments of the invention could be applied to calling cards, telephone bills, etc.

Figure 1:
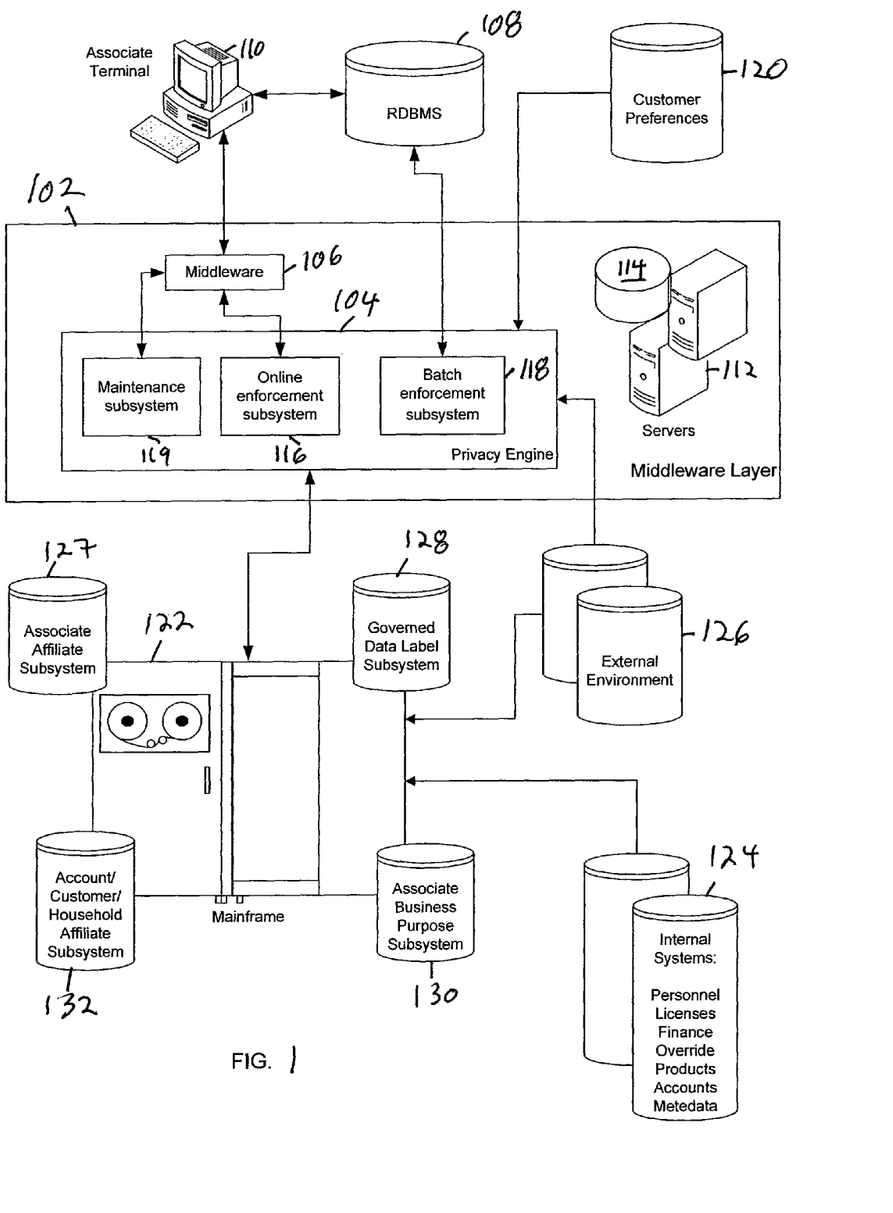
FIG. 1 is a system block diagram illustrating an example embodiment of the invention.

As previously mentioned, example embodiments of the present invention can deliver to associates of an enterprise automated compliance and/or enforcement for consumer privacy laws and privacy-related policies. FIG. 1 shows a system according to example embodiments of the invention. The block diagram of FIG. 1 illustrates functional connections between various hardware, software, and data elements that are used. FIG. 1 also provides a context for defining various terms as they will be used throughout this disclosure. The system of FIG. 1 includes middleware layer 102, within which is implemented "privacy engine" (PE) 104. PE 104 is designed to act as a central entity that ensures automated control of privacy compliance within the lines of business of an enterprise. PE 104 delivers privacy enforcement values to standard middleware applications 106, and/or relational database management system (RDBMS) 108, either one of which may further interact with associate terminal 110.

Middleware layer 102 of FIG. 1 houses both standard middleware components, such as middleware applications 106, and PE 104. The primary function of middleware applications is communication with other components. Standard middleware applications do not interface with end users or store data and are located in the middle of a client/server architecture. Both middleware applications and the PE can be implemented by servers 112 running appropriate computer program products housed on media 114, which is associated with the servers. Privacy engine 104 includes online enforcement subsystem 116, which interfaces with standard middleware applications 106 and batch enforcement subsystem 118, which interfaces with RDBMS 108. PE 104 also includes parameter maintenance subsystem 119. A customer preferences database, 120, is also functionally connected to PE 104. The customer preferences database stores customer preferences regarding sharing of information, for example, among companies affiliated with the enterprise that is implementing the invention. Such companies might be referred to herein as "affiliates" and would typically have customer-consumer relationships with the enterprise.

Still referring to FIG. 1, various data subsystems that are specifically designed in this example embodiment to house information used by the PE are maintained in mainframe computing system 122. These subsystems provide mapping tables and/or similar data structures using data from standard internal systems 124 as well as from systems external to the enterprise, or simply external to the part of the enterprise implementing a privacy solution according to an embodiment of the invention. These external systems can be referred herein to as external environment 126. The data subsystems include the associate affiliate subsystem, 127, which creates and maintains affiliate assignments for each associate in the enterprise. Governed data label subsystem 128 uses metadata from internal systems 124 as well as information on various government laws and regulations retrieved from external environment 126. The metadata describes how, when, and by whom data in the other systems is collected and how data is formatted in the various systems. Governed data label subsystem maintains a table of changes to policies and laws that need to be sent for review in response to daily requests sent to the PE.

Mainframe system 122 of FIG. 1 also houses an associate business purpose subsystem, 130. This subsystem contains information regarding the purpose and nature of each associates interaction with customer data, based on associate job codes. Each job code designates a function within the enterprise. Account/customer/household affiliate subsystem 132 provides mapping tables that indicate assignments for affiliates to accounts, customers, and/or households. In order to maintain these tables, this subsystem obtains information from external environment 126 as well as from the internal product system, internal finance system, and internal accounts systems, all part of systems 124. The accounts data specifies legal arrangements with customers, such as what types of accounts they maintain with the enterprise. The accounts system can also include information on customers and households. The product system provides mapping of accounts to various standard products and services offered by the enterprise. The finance system provides organizational data that would normally be used to account for the activities of the enterprise.

For completeness with respect to FIG. 1, internal systems 124 in this example embodiment also include other systems that may be referenced later in describing the operation of PE 104 and the various subsystems in detail. Internal systems 124 include the personnel systems for the enterprise. It can also include an override system, which contains data on manual overrides put in place that would specify exceptions to normal restrictions on associate access to data. A license system can also be included. The license system specifies which associates have legal qualifications to perform various functions, such as an investment broker license or an insurance broker license.

Figure 2:
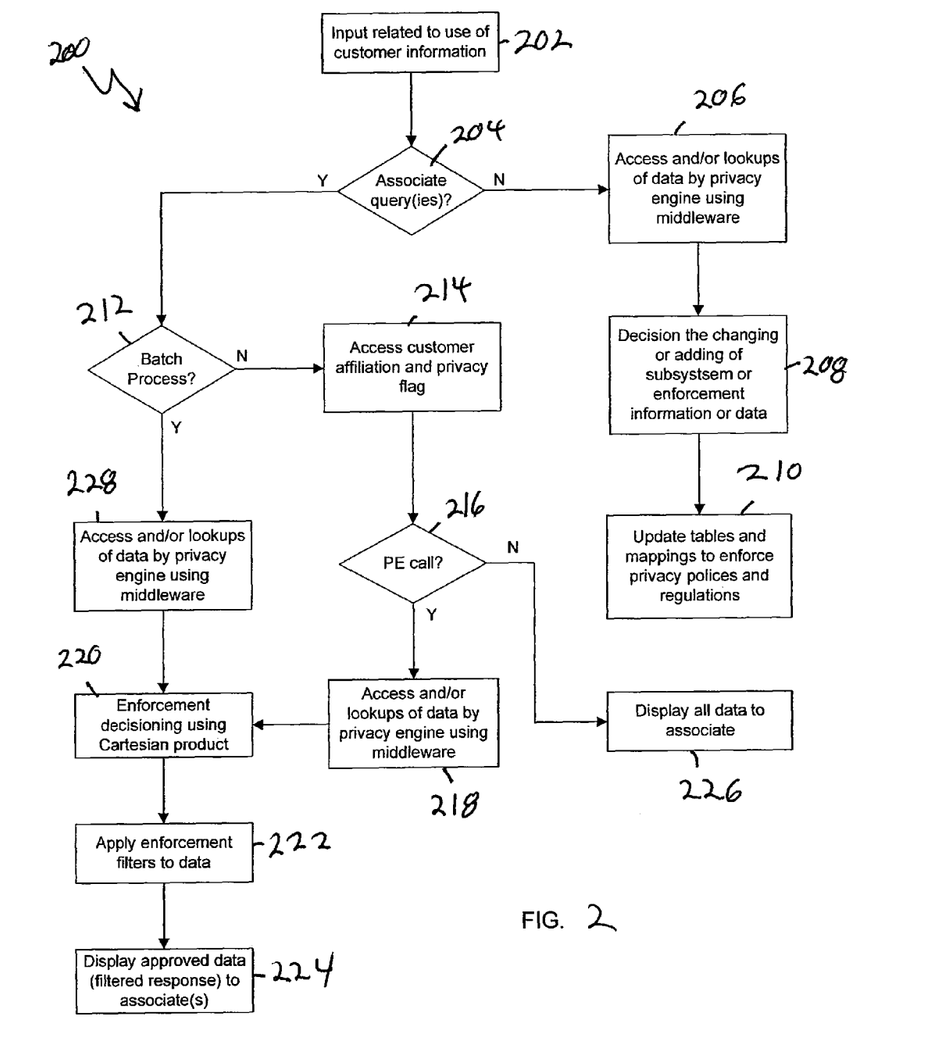
FIG. 2 is a flowchart that illustrates the high-level processes according to example embodiments of the invention.

FIG. 2 is a flowchart style diagram that illustrates methods according to example embodiments of the invention. FIG. 2 illustrates the methods as a series of process or subprocess blocks. FIG. 2 presents a high-level view. Basically, the methods of FIG. 2 can be characterized as receiving input, looking up information, decisioning based on the information, and providing an enforcement action. The input received can take the form of batch or on-line queries from associates, or updated information. The enforcement action can include filtering or regulating access to information, or updating tables within subsystems, or other data within the various databases of the enterprise so that an appropriate privacy posture is maintained. After a brief walk-through of FIG. 2, a detailed discussion of the various specific processes that can be described by all or parts of FIG. 2 will be presented in the context of the remaining block diagrams.

Process 200 of FIG. 2 begins when input is received at block 202. At decision block 204, processing branches depending on whether the input is an associate query or queries, or the receipt of new or changed information. If the input is updated or changed information, the PE looks up appropriate data via standard middleware applications at block 206. The PE decisions the adding or changing of subsystem data at bock 208, and the appropriate tables and mappings are actually updated by writing to the appropriate databases or data structures at block 210. Thus, the right-most branch of process 200 of FIG. 2 illustrates at a high level how new or changed information is dealt with. This part of process 200 can apply to updating information in the various subsystems previously discussed, or providing maintenance updates to a system that is carrying out the invention as described below. The decisioning needed for these updates can be carried out by the privacy engine and would typically be carried out by the parameter maintenance subsystem.

The associate affiliate subsystem creates affiliate assignment(s) for each associate. An associate can have multiple affiliate assignments. This affiliate assignment is used in the application of logic to determine if the customer data can be viewed by an associate. When new information is received, such as new or changed personnel data, license data, or override data, assignment of associate affiliate(s) is derived by the combination of updates. First, personnel updates can determine initial affiliate, a change in affiliate, or deletion of an affiliate. Secondly, license data can add an additional affiliate that is specific for insurance or investment, or change an affiliate. If the input indicates a license has expired, the input will trigger a deletion to the appropriate affiliate. The new or changed overrides can be provided, for example, by a Web-based system that allows associates to submit updates with approval from managers and a compliance representative. Such updates can add, change or delete an affiliate. To assign an affiliate, the system can look first at overrides, then at personnel data and use license data to supplement a decision. The result is written to the table(s) stored in the associate affiliate subsystem, 124 of FIG. 1.

During an update, the account/customer/household subsystem assigns the consumer data an affiliate based on unique triggers. A consumer level data affiliate may be derived to use in comparison against an associate's affiliate to establish the data elements the associate should view. Regulated data is not decisioned in this embodiment based on the affiliate of the customer or associate; only the business purpose is considered. The affiliate of consumer data is updated with one of the following triggers, where a "consumer" is an individual or legal entity, including both current and former customers as well as prospective customers that can or might use a product or service of the enterprise or an affiliate. An account is assigned an affiliate based on the product type of the account. There are three input conditions that trigger this assignment: the opening of a new account, a change to a product-to-affiliate mapping table, or a change to an organization-to-affiliate mapping table. This assignment is posted to an account table.

Also within the account/customer/household affiliate subsystem of the example embodiments, a customer is assigned an affiliate based on their account relationships, when certain input is received. There are six triggers for this assignment: the opening or closing of a customer account(s) through any direct or associate assisted channel, which changes a customer-to-account relationship, the addition, change, or deletion of the customer's relationship role, a change in a line of business product-to-affiliate mapping, a change to the organization-to-affiliate mapping, a change in an account status code, or a change in the relationship of a customer to an account. Once there is input changing any of these six items for the customer level data, decisioning reevaluates the customer's assignment, and the customer assignment is updated and stored in a table.

Changed or updated household level data can also trigger decisioning and updating for the account/customer/household affiliate subsystem. A household is assigned an affiliate based on a customer affiliate change. This change can be triggered by changes to the affiliates of any of the customer's in a household. Updates can also be triggered by changes in customers within the household. Either of these two triggers can create the need for an update to household affiliate assignment, as decisioned by the system. A household affiliate subsystem table is updated with a new assignment as needed.

The associate business purpose subsystem, 130 of FIG. 1, in example embodiments, assigns associates one and only one business purpose based on three types of input. Personnel can provide data that automatically adds, deletes or changes a business purpose value. Such an update is written to a business purpose mapping table. Alternatively, license data can be sent for an associate that changes the current business purpose. Updated or new license data is added to an associate license table. Finally, a business purpose override can be requested by an associate to change the current business purpose. Such a change is written to an associate override table. Based on any changes from the updates, the associate business purpose is decisioned, derived and assigned based on override data and job codes, supplemented by license data. The associate business purpose table is then updated with the new information.

Updates and changes to the governed data label (GDL) subsystem, 128 of FIG. 1 can be triggered with two types of input in this example embodiment. One is input related to an internal business process identified by the legal or management personnel of the enterprise and the other is an automated data process. For example, in the first case, laws can be passed, changed or repealed at the federal, state, city or county level. Policies of the enterprise can also be identified internally that affect how consumer data should be handled. The second trigger is the introduction of new data elements that are added to the internal metadata system. These new data elements can be manually reviewed, for example, by management and legal counsel. This GDL process can identify the privacy impact of the physical data elements based on current laws and policies.

In addition to subsystem updates discussed above, updates can be received from internal and external sources as part of system maintenance activities, and such updates can fall under the high-level description of the process of FIG. 2 discussed so far. For example, as previously mentioned, the override system in example embodiments can be implemented as a Web based tool for associates that is used to change either an associate's business purpose and/or affiliates. The PE can receive override data daily and update the business purpose and/or affiliate for each associate appropriately. The personnel system provides associates' job code data and the PE determines any updates and applies the job code to the associate business purpose subsystem as appropriate. The finance system can provide the PE with appropriate hierarchical data to determine the affiliate mapping. The license system in example embodiments is an internal database system that houses the investment and insurance licenses for associates. The PE can collect the license additions, changes and deletions and apply them appropriately to tables stored in the subsystems. The product system can provide product-to-affiliate mapping that is used to assign customer data to affiliates.

External sources can also provide data to the PE for maintenance purposes. External data can come from automated updates of the customer-to-account relationships and also to account status codes. Manual updates can be made by management, HR, and/or legal personnel. Finally, the customer preference system is maintained as the system of record for an affiliate sharing preference flag that is maintained at a customer level. This customer-level data is used to calculate the consumer preference at an account, customer, and household level.

Returning to FIG. 2, the other branches of process 200 are invoked when input received by the system takes the form of associate queries or requests. At decision block 212, the process branches depending on whether the query is a real-time, on-line query or one received with a number of queries in a batch process. In the case of an on-line query, processing proceeds to block 214. At block 214, the middleware applications access customer affiliation and privacy flag information. The middleware decisioning is carried out at block 216 by comparing the associate and customer's affiliate and if they are not the same, and the customer preferences system contains a privacy flag that is set to 'Yes' then a call is made to the PE. The maintenance subsystem keeps the privacy flag set correctly.

Still referring to FIG. 2, associate identifying data, consumer identifying data and a list of data labels can be retrieved by the PE at block 218. This data is used to identify the associate's affiliate, business purpose, consumer's affiliate, preference and jurisdiction and the corresponding governed data labels. This data, derived from the various subsystems, is decisioned at block 220 to determine if the associate/consumer pair is regulated or restricted by law or policy. Data labels to be blocked are determined and a list of data labels is returned to the middleware applications. Once the middleware has the list of blocked data labels, the middleware applications control the result sent to the associate by blocking the appropriate data, which can be thought of as applying enforcement filters as shown at block 222. The approved results are then displayed at block 224. If the call is not necessary, because no filtering is needed all data is displayed to the associate at block 226.

If a query in the embodiment of FIG. 2 is being handled by the batch enforcement subsystem as part of the batch process, the PE accesses appropriate data at block 228. The batch enforcement subsystem provides automated enforcement over the queries submitted against one or more data warehouses to obtain consumer information. In example embodiments, an SQL query can be received and retrieval of the appropriate data is performed by the RDBMS. Batch feeds are provided from the PE with the associate data, generic data labels, and the account/customer/household level data. Generic data labels group data elements into privacy related categories. This data is loaded to tables on the RDBMS to provide retrievable answers to the query. The RDBMS determines the decisioning logic. The batch enforcement subsystem decisions at block 228 in two steps. It first uses the associate's affiliate and business purpose, the account/customer/household affiliate and affiliate share flag information, and the generic and governed data labels for each business purpose to provide a Cartesian product mapping all of an enterprise's associates to customers. This Cartesian product is created and made available via files that are transmitted from the PE. A case statement is then used to interrogate against and apply this Cartesian product to selected attributes in order to provide enforcement filtering at block 222. The use of the Cartesian product mapping will be discussed further below with reference to FIG. 8.

Still referring to FIG. 2, at block 222, enforcement filters are again applied to the data, only this time for a batch query. When the associate is identified through the decisioning as having a privacy enforcement flag value of zero, the value of the relevant data label is always displayed. A case statement looks through PE-provided data for restricted data with a business purpose matching the associate business purpose. The case statement also looks through PE-provided data for regulated data. This case statement logic will determine the approved results. The approved results are returned for eventual viewing by the requesting associate as before at block 224. Note that in the batch case, specific data about associates and specific data about customers is maintained and provided to the RDBMS so that the RDBMS can follow a set of specific steps to enforce privacy results under the control of the privacy engine.

Reference is made above to restricted data. The term "restricted" as used above is meant to refer to information that is to be shared only for appropriate purposes and in a typical enterprise only with the approval of compliance and/or legal business organizations. This information may include details such as race, color, sex, religion, national origin, language preference, acceptance of public assistance, marital status, sexual orientation, and age. It might also include information related to specific laws and regulations, such as in the United States, for example, good faith exercise of rights under the Consumer Credit Protection Act, and information related to handicap or familial status. Other data elements, such as information related to how the enterprise acts in a fiduciary relationship may also be restricted. The term "regulated" as used herein to refer to regulated data is meant to invoke data related to affiliate assignments (both associate and account/customer/household), affiliate sharing preference, and business purpose. Such data can be used to determine what information is appropriate to display.

Figure 3:
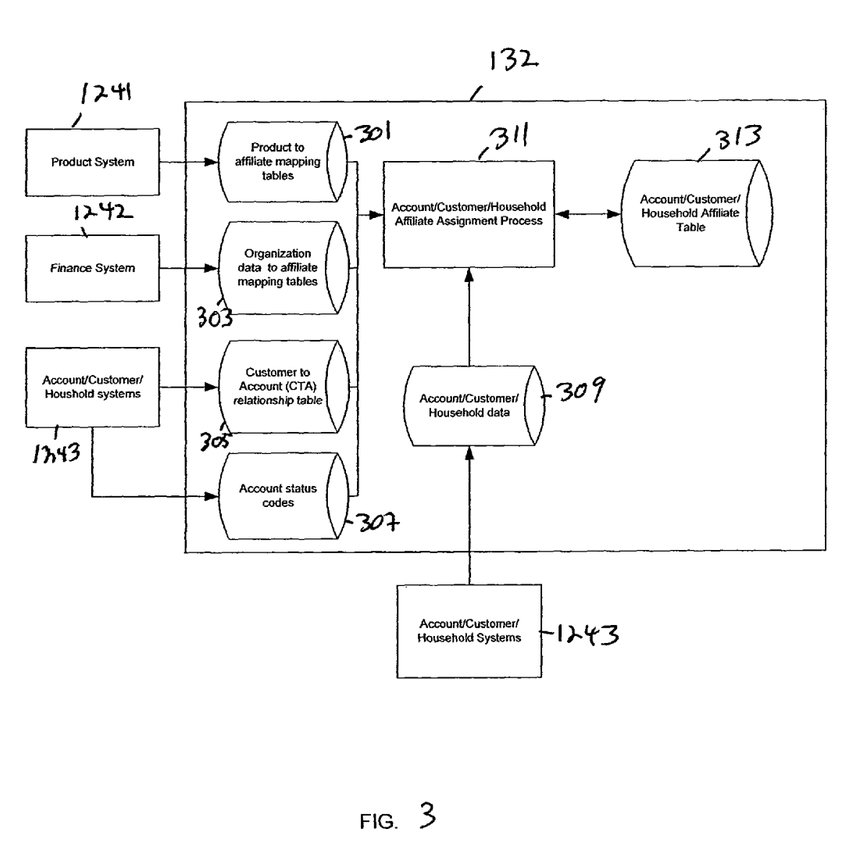
FIGS. 3-8 are combination block and flow diagrams that illustrate detailed connections and interactions among various elements of example embodiments of the invention.

FIGS. 3 through 8 illustrate process and structural detail of the various entities that make up a system according to example embodiments of the invention. Like reference numbers refer to like structures throughout the figures. Four-digit reference numbers refer to structures mentioned in FIG. 1 but not separately shown due to space considerations. FIG. 3 is a block and flow diagram illustrating detail of account/customer/household affiliate subsystem 132. Subsystem 132 is fed by product system 1241, which provides the product mapping. The product is mapped to the affiliate and stored in mapping table 301. Finance system 1242 provides organizational data. This organizational data is mapped to affiliates and stored in table 303. System 1243 (referred to in FIG. 1 simply as the "accounts" internal system) provides customer-to-account (CTA) relationships and account status codes. The CTA relationships are evaluated for meaning, for example, "ownership" vs. "beneficiary" or "interested Parties" and this information is stored in a mapping table 305. The account status codes are evaluated for meaning, for example, "open" vs. "closed" and this information is stored in mapping table 307.

Still referring to FIG. 3, system 1243 also provides data on accounts. This data necessarily includes customer and household information. This data is stored in table 309. The account, customer and household data is combined with the product-to-affiliate data, organization-to-affiliate data, CTA relationship data, and the account status code data by affiliate assignment process 311 to create a table, 313, of account, customer, and household affiliate assignments. This assignments table allows for quick access to information for comparison with an associate's affiliate to enable logic that provides decisioning with respect to affiliate sharing laws.

Figure 4:
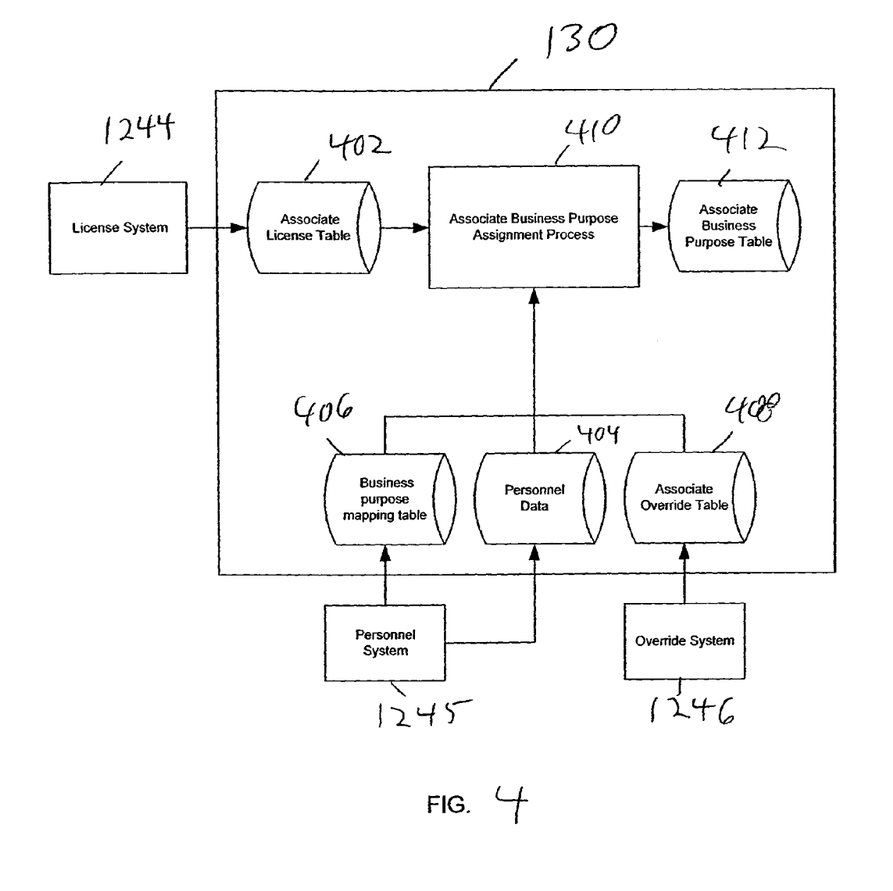

FIG. 4 is a block and flow diagram showing details of the associate business purpose subsystem, 130. Subsystem 130 is fed by license system 1244, which in these example embodiments provides the insurance and investment license data for associates. This data is stored in table 402 to indicate the specific license and date of expiration for each associate. Personnel system 1245 also provides data to subsystem 130. This data includes the job code and manager that is assigned to each associate, and the associate's identification information, all of which is stored in table 404. In addition, personnel system 1245 in this embodiment provides an overall master list of associate job codes, which is used to create business purpose mapping table 406. Override system 1246 provides overrides for associate business purposes as approved by management and/or compliance representatives based on job function. The override request is stored and processed for a specific associate for a specific time period, for example, one year. Overrides reside in table 408 within subsystem 130. Data from tables 402, 404, 406, and 408 feeds into process logic 410 for business purpose assignment for each associate. In example embodiments, the PE assigns business purpose first by the override, secondly the license and finally by job code. This business purpose assignment is stored for each associate in table 412 and is used to determine what privacy data can be viewed according to the law or policy that governs.

Figure 5:
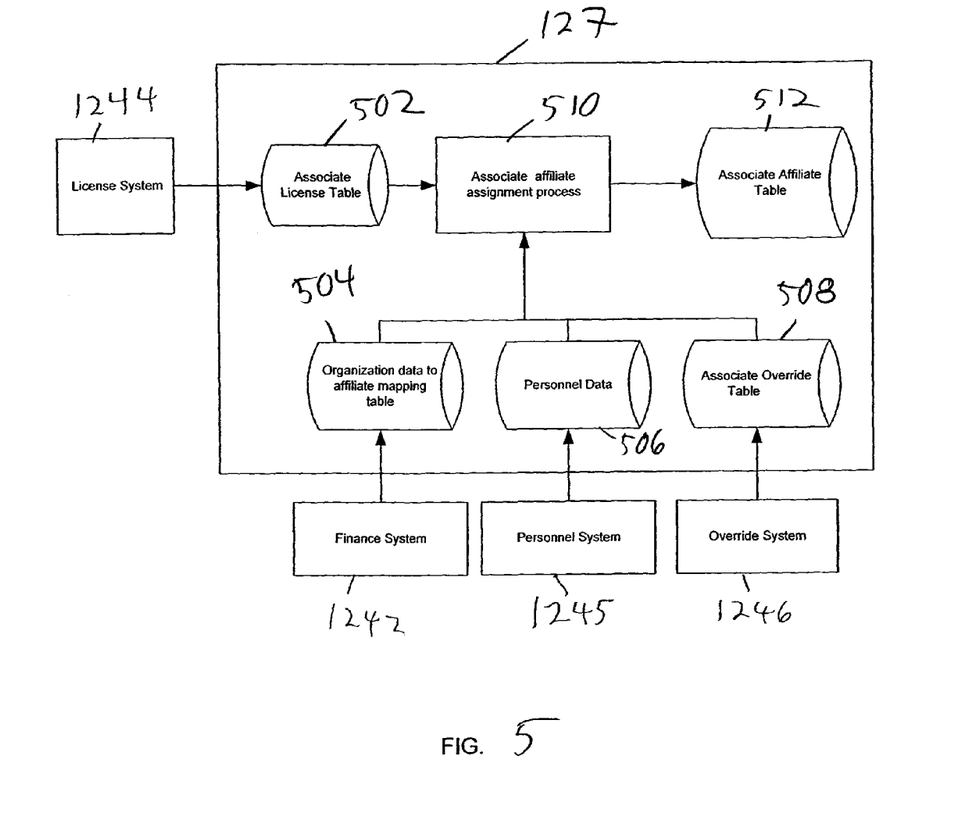

FIG. 5 illustrates detail of an example associate affiliate subsystem, 127. License subsystem 1244 provides data as before, now stored in table 502. Finance system 1242 provides the organizational data that is used to map to affiliates, and this data is stored with associate affiliate subsystem 127 in table 504. Personnel system 1245 provides the manager that is assigned to each associate and the each associate's personnel information, which is stored in table 506 within subsystem 127. Override system 1246 provides a fourth data source for associate affiliate subsystem 127, and the override data from override system 1246 is stored in table 508. The override data provides an associate's requested affiliate justification as approved by management or other appropriate authority, in a similar manner to that previously described. These four data feeds feed into associate affiliate assignment process 510. The affiliate assignment is determined first by the override request and secondly by company and hierarchy information. Additional affiliates can added based on the associate's license. The affiliate assignment for each associate is stored in table 512.

Figure 6:
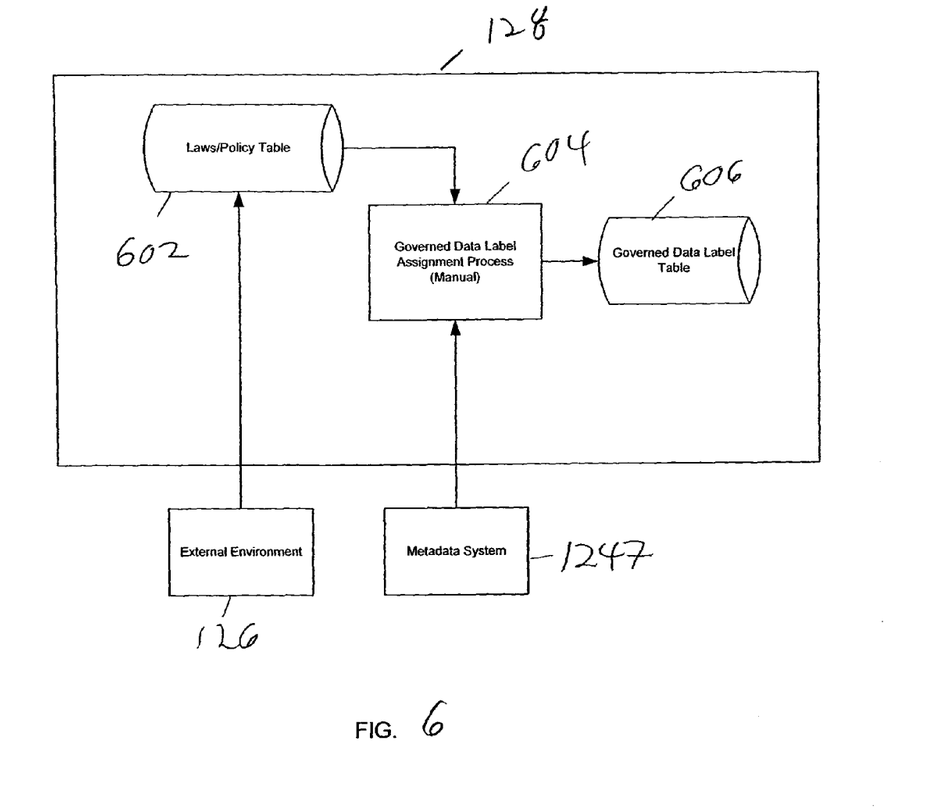

FIG. 6 shows details of an example governed data label subsystem, 128. Subsystem 128 is fed by two data sources. External environment 126 introduces both laws (including regulations) and internal policies that govern consumer data. This data can be provided and kept up to date, for example, by legal, compliance, marketing, or similar functions within the enterprise. The most current governing information is kept in laws and policy table 602. A second source of data for subsystem 128 is metadata system 1247, which includes data elements from both online and batch sources. Manual review can be conducted of the data elements at regular intervals to ensure the elements are assigned as governed under the appropriate laws and policies. This manual review is represented by process 604. The governed data labels are stored in table 606 for use in metadata feeds to online systems.

Figure 7:
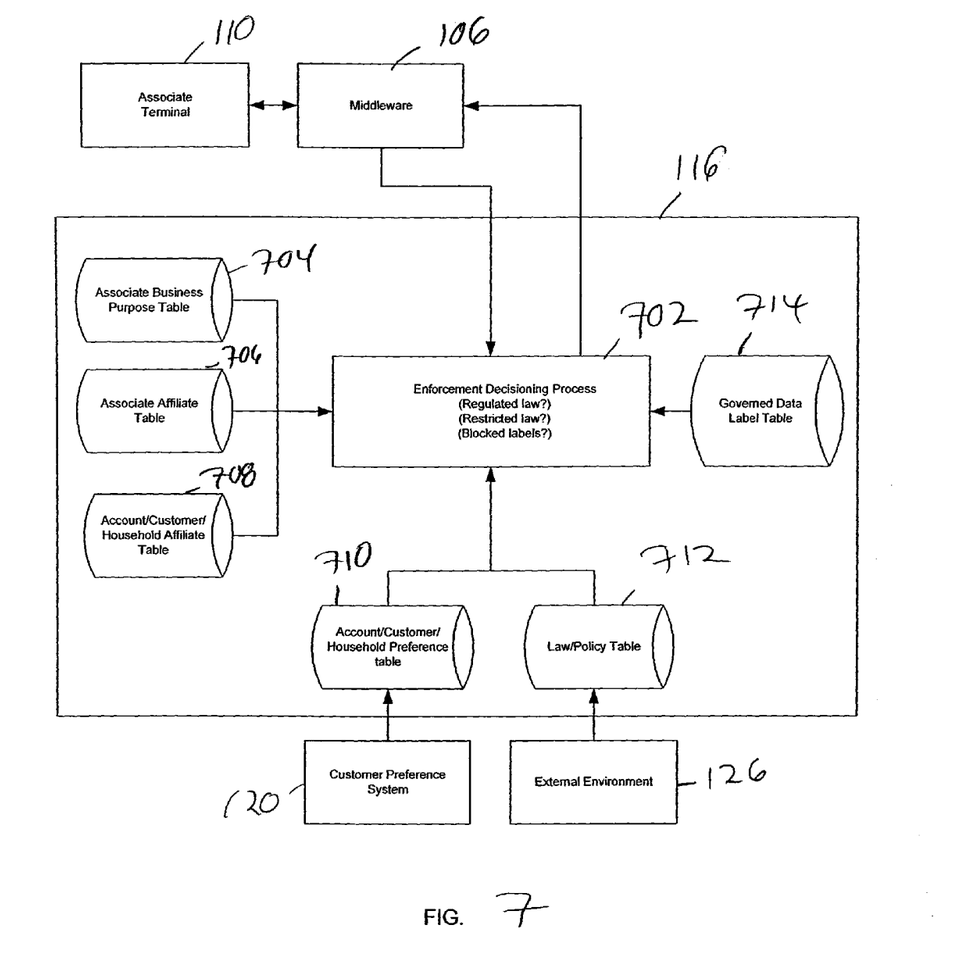

FIG. 7 illustrates details of the online enforcement subsystem, 116. The online enforcement subsystem is an automated privacy system that governs the consumer data elements that the associate can view when they are retrieving the customer's information from associate terminal 110. The request for information is transmitted through middleware 106 to enforcement process 702. There are two sources of associate information on the system of record that are applied in enforcement process. The enforcement logic determines the physical data elements that are regulated and restricted by law (or policy) and the algorithm determines the labels that will be blocked from the view of the associate. The labels that are to be blocked will be sent back to middleware 106 and the enforcement action will ultimately block the fields on terminal 110.

Still referring to FIG. 7, enforcement process 702 makes use of associate business purpose, stored in the subsystem in table 704, associate affiliate information, stored in the subsystem in table 706, and account/customer/household affiliate information, stored in table 708. Additionally, consumer data that is sourced to the enforcement decisioning process can include customer level data such as account, customer and household preference data that is stored in table 710, which is updated from the customer preference system, 120, which provides a customer's affiliate sharing flag. An additional external source of data to be applied in the enforcement process is the laws and/or policies information supplied by external environment 126 and stored for access by the enforcement decisioning process in table 712. Finally, governed data labels for use by enforcement decisioning process 702 reside in table 714. Enforcement process 702 applies attributes of both the associate and the customer, and compares the attributes of the associate's affiliate, business purpose and ID with the attributes of the customer's affiliate, jurisdiction, preference and ID as well as the governed data labels from table 714.

Figure 8:
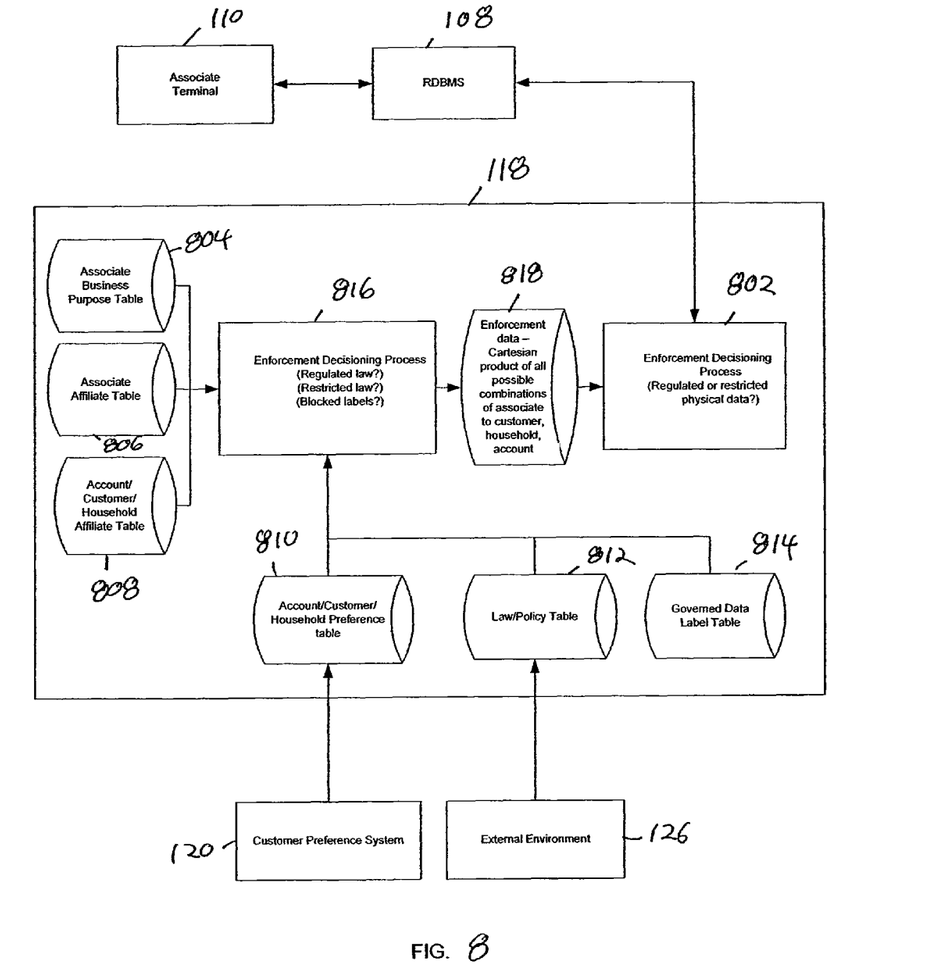

FIG. 8 illustrates details of batch enforcement subsystem 118, which is another automated privacy subsystem that governs the use of customers' data by associates. This subsystem handles queries in batch mode, although such queries may still be submitted via user terminals such as associate terminal 110. The requests for information are transmitted through RDBMS 108 to enforcement decisioning process 802. Sources of data applied to this enforcement process are the business purpose table 804, the associate's affiliate table 806, and account/customer/household table 808. Another source of consumer data is the customer preference system, 120, which provides, at least, the customer's affiliate sharing flag to be stored in table 810 for ease of use by the enforcement processes. External environment 126 supplies law and policy information to be stored in table 812. The governed data labels are stored for ease of access in table 814.

The PE creates batch feeds that represent the customer and associate combinations and the protected data label for each set of results. In an example embodiment, these feeds are created nightly. Enforcement decisioning process 816 of FIG. 8 has as inputs associate affiliates, associate business purpose, customer affiliate, customer jurisdiction, customer preferences, governed data labels, associate ID and customer ID and outputs enforcement data 818 as a Cartesian product of all possible associate to account, customer, and household combinations for each privacy law and policy. Decisioning process 802 reviews the associate data, customer data and the law/policy enforcement data. A comparison of associate and customer affiliates is performed and the affiliate share flag is reviewed if the data is "regulated." Otherwise the business purpose is reviewed with respect to the associate and customer data if the physical data is "restricted." The algorithm determines the result set and blocks or nulls the physical data if required. The process produces a result set that provides the views that block the governed data for the associate through RDBMS 108 and the enforcement action will ultimately block the fields on terminals such as terminal 110.

The purpose of the Cartesian product in the example embodiments is to pre-calculate two sets of blocked labels in order to reduce the workload that would otherwise be imposed on the PE. Having these blocking decisions effectively pre-calculated also provides for faster decisioning than would otherwise be possible. One set of blocked data labels is for restricted data, and the other set of blocked labels is for regulated data. In effect, the set of all associates is multiplied by the set of all customers in each case and a set of generic data labels is the result.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of facilitating privacy enforcement, the computer-implemented method comprising:
   receiving, from an associate of an enterprise, input related to use of stored customer information;
   accessing at least one of a plurality of subsystems including data related to customers;
   accessing at least one of a plurality of subsystems including data related to associates;
   determining, based on the data related to associates, an attribute of the associate;
   comparing the data related to customers with the attribute of the associate, wherein the comparison determines the stored customer information that the associate is able to access;
   determining which of a plurality of subsystems to access based on comparing of data related to customers and the attribute of the associate;
   wherein the plurality of subsystems comprises a governed data label subsystem storing metadata describing how, when and by whom government data stored in one or more external environments is collected, describing how, when and by whom policy data stored in at least one of the plurality of subsystems is collected, the government data comprising data related to government laws or government regulations, the metadata also describing how government data is formatted in the one or more external environments and how policy data is formatted in at least one of the plurality of subsystems;

accessing at least one of the plurality of subsystems to retrieve policy data and at least one of the external environments to retrieve government data based at least in part on the metadata;

maintaining, using the governed data label subsystem, a table of changes comprising a plurality of changes to enterprise policies, government laws and government regulations, the maintaining comprising escalating one or more of the changes in the table of changes for review in response to one or more requests received from associates of the enterprise;

updating the policy data, using the governed data label subsystem, in response to escalating the one or more changes;

filtering, using a processor, at least some of the stored customer information that the associate is able to access, wherein filtering comprises:

characterizing the data related to the associates and the data related to the customers in order to determine which from a plurality of restriction levels is applicable to the data related to the associates, resulting in a first restriction level, and which from a plurality of restriction levels is applicable to the data related to the customers, resulting in a second restriction level;

computing a third restriction level based on a Cartesian product mapping of the first restriction level and the second restriction level, and filtering, based at least in part on the comparison of the data related to the customer with the third restriction level, the updated policy data and the government data; and presenting the filtered stored customer information to the associate.

2. The computer-implemented method of claim 1 wherein:
the input comprises a query from the associate; and
the filtering comprises filtering a response to the query.

3. The computer-implemented method of claim 1 wherein the input comprises new enforcement data.

4. The computer-implemented method of claim 1 wherein the input comprises subsystem change information.

5. The computer-implemented method of claim 1 wherein:
the input comprises a query from the associate; and
the filtering comprises selectively displaying data to the associate based on at least one of a customer affiliation and a privacy flag.

6. The computer-implemented method of claim 4 wherein the subsystem change information further comprises information related to at least one of governed data labels, business purpose, an account, a household and an affiliate.

7. A privacy enforcement system comprising:
a privacy engine comprising a processor that executes computer readable instructions stored on a non-transitory computer readable medium to:
receive, from an associate, input related to use of stored customer information, wherein the stored customer information is associated with a customer;
communicate with a source data subsystem to receive data related to the customer;
communicate with a source data subsystem to receive data related to the associate;
compare the data related to the customer with the data related to the associate, wherein the comparison determines the stored customer information that the associate is able to access;
determine which of a plurality of subsystems to access based on comparing of data related to the customer and the data related to the associate;

wherein the plurality of subsystems comprises a governed data label subsystem storing metadata describing how, when and by whom government data stored in one or more external environments is collected, describing how, when and by whom policy data stored in at least one of the plurality of subsystems is collected, the government data comprising data related to government laws or government regulations, the metadata also describing how government data is formatted in the one or more external environments and how policy data is formatted in at least one of the plurality of subsystems; and access at least one of the plurality of subsystems to retrieve policy data and at least one of the external environments to retrieve government data based at least in part on the metadata; and a source data subsystem comprising a processor to:

maintain a table of changes comprising a plurality of changes to enterprise policies, government laws and government regulations, the maintaining comprising escalating one or more of the changes in the table of changes for review in response to one or more requests received from associates of the enterprise;

update the policy data, in response to escalating the one or more changes; and wherein the privacy engine is further to:

filter at least some of the stored customer information that the associate is able to access, wherein filtering comprises:

characterizing the data related to the associates and the data related to the customers in order to determine which from a plurality of restriction levels is applicable to the data related to the associates, resulting in a first restriction level, and which from a plurality of restriction levels is applicable to the data related to the customers, resulting in a second restriction level;

computing a third restriction level based on a Cartesian product mapping of the first restriction level and the second restriction level, and filtering, based at least in part on the comparison of the data related to the customer with the third restriction level, the updated policy data and the government data; and present the filtered stored customer information to the associate.

8. The privacy enforcement system of claim 7 further comprising a customer preferences database operatively connected to the processor of the privacy engine.

9. The privacy enforcement system of claim 7 further comprising:
an online enforcement subsystem; and
a batch enforcement subsystem.

10. The privacy enforcement system of claim 7 further comprising:
an associate affiliate subsystem;
a metadata subsystem;
an account/customer/household affiliate subsystem; and
an associate business purpose subsystem.

11. The privacy enforcement system of claim 8 further comprising:
an online enforcement subsystem; and
a batch enforcement subsystem.

12. The privacy enforcement system of claim 8 further comprising:
- an associate affiliate subsystem;
- a metadata subsystem;
- an account/customer/household affiliate subsystem; and
- an associate business purpose subsystem.

13. The privacy enforcement system of claim 7 wherein the privacy engine is disposed in a middleware layer.

14. The privacy enforcement system of claim 8 wherein the privacy engine is disposed in a middleware layer.

15. The privacy enforcement system of claim 9 wherein the privacy engine is disposed in a middleware layer.

16. The privacy enforcement system of claim 11 wherein the privacy engine is disposed in a middleware layer.

17. A computer program product, the computer program product comprising at least one non-transitory computer-readable medium having computer-readable program code embodied therein, the computer-readable program code comprising:
- an executable code configured for receiving, from an associate of an enterprise, input related to use of stored customer information;
- an executable code configured for accessing at least one of a plurality of subsystems including data related to customers;
- an executable code configured for accessing at least one of a plurality of subsystems including data related to associates;
- an executable code configured for determining, based on the data related to associates, an attribute of the associate;
- an executable code configured for comparing the data related to customers with the attribute of the associate, wherein the comparison determines the stored customer information that the associate is able to access;
- an executable code configured for determining which of a plurality of subsystems to access based on comparing of data related to customers and the attribute of the associate, wherein the plurality of subsystems comprises a governed data label subsystem storing metadata describing how, when and by whom government data stored in one or more external environments is collected, describing how, when and by whom policy data stored in at least one of the plurality of subsystems is collected, the government data comprising data related to government laws or government regulations, the metadata also describing how government data is formatted in the one or more external environments and how policy data is formatted in at least one of the plurality of subsystems;
- an executable code configured for accessing at least one of a plurality of subsystems to retrieve policy data and at least one of the external environments to retrieve government data based at least in part on the metadata;
- an executed code configured for maintaining, using the governed data label subsystem, a table of changes comprising a plurality of changes to enterprise policies, government laws and government regulations, the maintaining comprising escalating one or more of the changes in the table of changes for review in response to one or more requests received from associates of the enterprise;
- an executable code configured for updating the policy data, using the governed data label subsystem, in response to escalating the one or more changes;
- an executable code configured for filtering, using a processor, at least some of the stored customer information that the associate is able to access, wherein filtering comprises:
  - characterizing the data related to the associates and the data related to the customers in order to determine which from a plurality of restriction levels is applicable to the data related to the associates, resulting in a first restriction level, and which from a plurality of restriction levels is applicable to the data related to the customers, resulting in a second restriction level;
  - computing a third restriction level based on a Cartesian product mapping of the first restriction level and the second restriction level, and
  - filtering, based at least in part on the comparison of the data related to the customer with the third restriction level, the updated policy data and the government data; and
- an executable code configured for presenting the filtered stored customer information to the associate.

18. The computer program product of claim 17 wherein:
the input comprises a query from the associate; and
the filtering comprises filtering a response to the query.

19. The computer program product of claim 17 wherein the input comprises new enforcement data.

20. The computer program product of claim 17 wherein the input comprises subsystem change information.

21. The computer program product of claim 17 wherein:
the input comprises a query from the associate; and
the filtering comprises selectively displaying data to the associate based on at least one of a customer affiliation and a privacy flag.

* * * * *